United States Patent Office 2,979,507
Patented Apr. 11, 1961

2,979,507

1-(2-THENOYL)ALKYL-4-ARYLPIPERAZINES

Paul Adriaan J Janssen, Antwerpse Steenweg 16, Vosselaar, near Turnhout, Belgium No Drawing. Filed Mar. 26, 1959, Ser. No. 801,989

8 Claims. (Cl. 260—268)

The present invention relates to a new group of piperazine derivatives and more particularly to 1-(2-thenoyl)-alkyl-4-arylpiperazines of the general structural formula

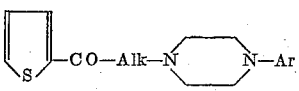

and the pharmaceutically acceptable non-toxic salts thereof, wherein Ar is a monocyclic aryl radical, preferably of less than nine carbon atoms, and Alk is a lower alkylene radical.

In the foregoing structural formula, the radical Ar can represent halophenyl, e.g. fluorophenyl, chlorophenyl, bromophenyl, iodophenyl; lower alkyloxyphenyl, e.g. methoxyphenyl, ethoxyphenyl; and monocyclic aromatic hydrocarbon radicals e.g. phenyl, tolyl, xylyl, ethylphenyl.

The radical Alk represents a lower alkylene radical such as methylene, ethylene, propylene, trimethylene, tetramethylene, butylene, pentamethylene, methylpropylene, and hexamethylene.

The organic bases of this invention form pharmaceutically useful non-toxic salts with a variety of inorganic and strong organic acids including sulfuric, phosphoric, hydrochloric, hydrobromic, hydriodic, sulfamic, citric, lactic, maleic, malic, succinic, tartaric, cinnamic, acetic, benzoic, gluconic, ascorbic and related acids. They also form quaternary ammonium salts with a variety of organic esters of sulfuric, hydrohalic and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethylsulfate, diethylsulfate, methyl benzenesulfonate, ethyl toluenesulfonate, ethylene chlorohydrin, propylene chlorohydrin, allyl bromide, methallyl bromide and crotyl bromide.

The compounds of this invention can be prepared by the condensation of a thenoylalkyl halide of the formula

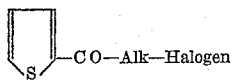

with an appropriately selected 4-arylpiperazine. The condensation can be carried out in an inert organic solvent such as an aromatic hydrocarbon, e.g. benzene, toluene, xylene; a lower alkanol, e.g. ethanol, propanol, butanol; and a lower alkanone, e.g. butanone, pentanone. In certain cases the reaction rate can be usefully accelerated by use of elevated temperatures.

Another method for the preparation of these compounds is the condensation of aniline or a substituted aniline of the formula

with a compound of the formula

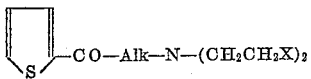

wherein X is a strong electronegative group such as a halogen, arylsulfonoxy, alkylsulfonoxy, and especially a chloro, bromo, or p-toluenesulfonoxy group.

The thenoylalkyl halides used as intermediates can be prepared by the Friedel-Crafts reaction employing, for example, γ-chlorobutyryl chloride and thiophene. The reaction can be carried out in benzene or petroleum ether solution. A milder catalyst such as stannic chloride is used rather than aluminum chloride.

The compounds of this invention have useful pharmacological properties. They are potent depressants of the central nervous system and exhibit marked tranquilizing effects. They are barbiturate potentiators and they inhibit the righting reflex in experimental animals.

The compounds which constitute this invention and the methods for their preparation will appear more fully from a consideration of the following examples, which are given for the purpose of illustration only and are not to be construed as limiting the invention in spirit or in scope. In these examples quantities are indicated as parts by weight. Temperatures are expressed in degrees centigrade (° C.).

Example 1

A mixture of 84 parts of anhydrous thiophene, 141 parts of γ-chlorobutyryl chloride and 870 parts of anhydrous benzene is cooled to 0 to −5° C. While this temperature is maintained, 260 parts of stannic chloride are added slowly over a 2 hour period. After the addition is complete, the cooling bath is removed and the stirring is continued for about an hour. The reaction mixture is then poured into a mixture of 60 parts of concentrated hydrochloric acid and 450 parts of ice water. The organic layer is separated, washed with water, dried over anhydrous calcium chloride and filtered. The filtrate is concentrated under reduced pressure and the residue is distilled to yield 2-(γ-chlorobutyryl)thiophene which boils at 144–146° C. at 11 mm. of pressure.

In a bomb a mixture of 9.4 parts of 2-(γ-chlorobutyryl)-thiophene, 16.2 parts of 1-phenylpiperazine, and 0.1 part of potassium iodide in 120 parts of toluene is heated for 72 hours at a temperature of 145–150° C. After cooling, the mixture is filtered and the filtrate is diluted with 800 parts of ether. Dry, gaseous hydrogen chloride is introduced into the solution, whereupon there is obtained the crude 1-[γ-(2-thenoyl)propyl]-4-phenylpiperazine dihydrochloride. The product is collected on a filter and purified by recrystallization from a mixture of acetone, 2-propanol and methanol. The white, crystalline precipitate decomposes at 203–205° C.

By substituting 10 parts of γ-chloro-β-methylbutyryl chloride for the γ-chlorobutyryl chloride used in the foregoing procedure there is obtained the dihydrochloride of 1-[γ-(2-thenoyl)-β-methylpropyl]-4-phenylpiperazine in white, prismatic crystals. The compound has the structural formula

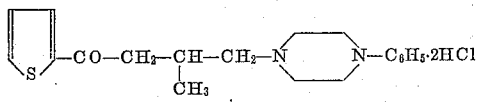

Example 2

In an open flask a mixture of 9.4 parts of 2-(γ-chlorobutyryl)thiophene and 16.2 parts of 1-phenylpiperazine is heated for 10 hours at a temperature of 100° C. The mixture is extracted with 450 parts of hot ether. The residue is removed by filteration and the filtrate is evaporated. The oily residue is dissolved in ether, and the ethereal solution is dried over anhydrous potassium carbonate and filtered. Anhydrous, gaseous hydrogen chloride is introduced into the solution. The precipitated hydrochloride is recrystallized from a mixture of acetone, 2-propanol, and methanol. The impure product is collected on a filter and dissolved in a mixture of acetone and methanol to yield the first crop of product crystallizing at about −15° C. Upon concentration of the solution, a second crop of 1-[γ-(2-thenoyl)propyl]-4-phenylpiperazine hydrochloride is obtained when the solution is cooled to −15° C. The gray powder melts at 186–187° C.

*Example 3*

A mixture of 185 parts of bis(β-ethanol)amine and 177 parts of 1-amino-3-fluorobenzene is added to 280 parts of 12 normal hydrochloric acid. About 264 parts of water are evaporated and the remaining solution is rendered alkaline with 336 parts of 44% sodium hydroxide solution. This solution is extracted with chloroform. The organic layer is separated, dried over anhydrous potassium carbonate, filtered and fractionally distilled to yield 1-(m-fluorophenyl)piperazine boiling at about 145–155° C. at 3 mm. pressure.

A mixture of 8.7 parts of 2-(γ-chlorobutyryl)thiophene and 17 parts of 1-(m-fluorophenyl)piperazine is heated for 10 hours at a temperature of 100–105° C. The reaction mixture is extracted with 750 parts of water and 600 parts of ether. The organic layer is separated, dried over anhydrous potassium carbonate, filtered and evaporated. The residue is taken up in ether and vacuum distilled nearly to dryness. The product is collected on a filter and recrystallized from diisopropyl ether to yield 1-[γ-(2-thenoyl)propyl]-4-(m-fluorophenyl)piperazine melting at 68.2–70.2° C.

*Example 4*

A mixture of 157.7 parts of bis(β-ethanol)amine and 187.2 parts of 1-amino-4-fluorobenzene is introduced into a flask. The mixture is cooled on an ice bath, whereupon 325 parts of 12 normal hydrochloric acid are added portionwise. Approximately 290 parts of water are evaporated, and to the remaining solution are added 128 parts of sodium hydroxide solution. The solution is diluted with water and extracted with chloroform. The organic layer is separated, dried over anhydrous potassium carbonate, filtered, and fractionally distilled to yield 1-(p-fluorophenyl)piperazine boiling at about 105–120° C. at 1 mm. pressure.

In a sealed reactor a mixture of 9.4 parts of 2-(γ-chlorobutyryl)thiophene, 23 parts of 1-(p-fluorophenyl)-piperazine and 0.1 parts of potassium iodide in 120 parts of toluene is heated for 72 hours at a temperature of 145–150° C. The reaction mixture is cooled and then treated with 500 parts of water and 750 parts of ether. The ether solution is separated, dried over anhydrous potassium carbonate, and filtered. Dry hydrogen chloride gas is passed through the solution and a semisolid precipitate results. After decanting the solvent, the crude product is recrystallized from a mixture of 2-propanol and methanol to yield two crops of crystals. These are combined and dissolved in 400 parts of boiling water, whereupon an excess of sodium hydroxide solution is added. An oil separates and solidifies on cooling to room temperature. The crude base is collected on a filter and recrystallized from ethanol to yield 1-[γ-(2-thenoyl)propyl]-4-(p-fluorophenyl)piperazine melting at about 82.5–83° C.

*Example 5*

In an open flask a mixture of 9.4 parts of 2-(γ-chlorobutyryl)thiophene and 19.6 parts of 1-(o-chlorophenyl)piperazine is heated for 10 hours at a temperature of 110° C. Upon treatment with ether, the oily layer of the reaction mixture solidifies. The solid residue is collected on a filter and extracted with boiling diisopropyl ether. The ether solution is washed with water, dried over anhydrous potassium carbonate, and filtered. Dry, gaseous hydrogen chloride is introduced into the solution, whereupon an oily hydrochloride is formed which solidifies in a mixture of acetone and 2-propanol on standing at −15° C. In this manner there is obtained 1-[γ-(2-thenoyl)propyl]-4-(o-chlorophenyl)piperazine hydrochloride melting at about 202.5–203° C.

*Example 6*

A mixture of 9.4 parts of 2-(γ-chlorobutyryl)-thiophene and 19.6 parts of 1-(m-chlorophenyl)piperazine is heated in an open flask for 10 hours at a temperature of 105–110° C. After cooling to room temperature, the mixture is triturated with 750 parts of water and 600 parts of ether. The mixture is then filtered, and the residue is recrystallized from a mixture of 2-propanol and water at −15° C. to yield the first crop of 1-[γ-(2-thenoyl)propyl]-4-(m-chlorophenyl)piperazine melting at about 103.6–104.6° C. A second crop is obtained by evaporating the ether solution and recrystallizing the residue from ether.

*Example 7*

A mixture of 9.4 parts of 2-(γ-chlorobutyryl)thiophene and 19.7 parts of 1-(p-chlorophenyl)piperazine is heated for 10 hours at a temperature of 105° C. The mixture is extracted with 500 parts of water and 400 parts of ether. The ether layer is separated, dried over anhydrous potassium carbonate, filtered, and evaporated. The residue is recrystallized from 2-propanol to yield 1-[γ-(2-thenoyl)propyl]-4-(p-chlorophenyl)piperazine melting at about 94.5–96.5° C. 1-[β-(2-thenoyl)ethyl]-4-(p-chlorophenyl)piperazine is made in an analogous manner and melts at about 82.2–83.6° C.

*Example 8*

In an open flask a mixture of 9.4 parts of 2-(γ-chlorobutyryl)thiophene and 17.6 parts of 1-(o-tolyl)piperazine is heated for 10 hours at 75° C. The reaction mixture is extracted with water and ether, and the ether layer is separated, dried over anhydrous potassium carbonate, filtered and evaporated. The residue is taken up in 2-propanol and evaporated. The resulting residue is dissolved in ether and the solution is filtered. Dry hydrogen chloride gas is passed through the filtrate. In the presence of activated charcoal, the resulting product is dissolved and boiled in a mixture of acetone, 2-propanol, and methanol. The solution is filtered and then cooled to room temperature. The product is collected on a filter and recrystallized from a mixture of acetone, 2-propanol, and methanol to yield 1-[γ-(2-thenoyl)propyl]-4-(o-tolyl)piperazine hydrochloride melting at about 212–213° C.

*Example 9*

A mixture of 9.5 parts of 2-(γ-chlorobutyryl)thiophene and 17.6 parts of 1-(m-tolyl)piperazine is heated in an open flask for 5 hours at a temperature of 105–110° C. After the contents of the flask are cooled to room temperature, 1000 parts of water and 800 parts of ether are added. The ether layer is separated, and the ethereal solution is dried over anhydrous magnesium sulfate, filtered, and evaporated. The residue is first recrystallized from a mixture of ethanol and water and then from a mixture of low-boiling petroleum ether and ethanol to yield 1-[γ-(2-thenoyl)propyl]-4-(m-tolyl)piperazine melting at about 74–76° C.

*Example 10*

A mixture of 9.5 parts of 2-(γ-chlorobutyryl)thiophene and 17.6 parts of 1-(p-tolyl)piperazine is heated in an open flask for 10 hours at a temperature of 105–110° C. The contents of the flask are cooled to room temperature and 160 parts of ether are added. The ethereal solution is washed with water, and then dried over anhydrous potassium carbonate. The solvent is evaporated and the product is recrystallized from ethanol and water to yield 1-[γ-(2-thenoyl)propyl]-4-(p-tolyl)piperazine melting at about 77.5–78.5° C. The dihydrochloride melts at about 211–216.5° C.

Example 11

To 157.5 parts of bis(β-ethanol)amine in 212 parts of 1-amino-2,5-dimethylbenzene is added portionwise 270 parts of hydrochloric acid. When the addition is completed, the reaction mixture is heated on an oil bath, and about 253 parts of water are evaporated. The solution is cooled and rendered alkaline with 133 parts of sodium hydroxide in 222 parts of water. The solution is diluted and extracted with chloroform. The chloroform layer is separated, dried over anhydrous potassium carbonate, filtered, and fractionated to yield 1-(2,5-dimethylphenyl)-piperazine boiling at about 110–120° C. at 1 mm. pressure.

A mixture of 5.5 parts of 2-(γ-chlorobutyryl)thiophene and 11 parts of 1-(2,5-dimethylphenyl)piperazine is heated for 10 hours at a temperature of 100° C. The reaction mixture is boiled with 400 parts of diisopropyl ether. The insoluble part is filtered off, and the filtrate is evaporated. The residue is taken up in 240 parts of 2-propanol. Dry, gaseous hydrogen chloride is introduced into the solution, whereupon there precipitates the hydrochloride which is redissolved and retreated with hydrogen chloride gas. The product is collected on a filter. The gray, amorphous 1-[γ-(2-thenoyl)propyl]-4-(2,5-dimethylphenyl)piperazine dihydrochloride melts at about 214–215° C.

Example 12

A mixture of 6.14 parts of 2-(γ-chlorobutyryl)thiophene and 12.5 parts of 1-(o-anisyl)piperazine is heated for 10 hours at a temperature of 110° C. The reaction mixture is boiled with 240 parts of diisopropyl ether, the insoluble residue is filtered off, the filtrate is washed with water and dried over anhydrous potassium carbonate. Dry, gaseous hydrogen chloride is introduced into the ether solution, whereupon there is obtained a precipitate which is recrystallized from a mixture of acetone and 2-propanol. This fraction and the filtrate are treated with 240 parts of 2-propanol and anhydrous hydrogen chloride gas is passed through the solution. The 1-[γ-(2-thenoyl)propyl]-4-(o-anisyl)piperazine dihydrochloride is collected on a filter. The grey, amorphous crystals melt at about 197–201.8° C. The 1-[β-(2-thenoyl)ethyl]-4-(o-anisyl)piperazine dihydrochloride is made in an analogous manner and melts at about 182.5–185° C.

Example 13

In an open flask a mixture of 7.7 parts of 2-(γ-chlorobutyryl)thiophene and 16.8 parts of 1-(p-anisyl)piperazine is heated for 10 hours at a temperature of 100° C. The reaction mixture is boiled in diisopropyl ether, and the insoluble residue is filtered off. The filtrate is then evaporated until a precipitate is obtained. This precipitate is collected on a filter and dissolved in diisopropyl ether. The solution is boiled with activated charcoal, filtered, and cooled to about 0° C. The white plates of 1-[γ-(2-thenoyl)propyl]-4-(p-anisyl)piperazine are collected on a filter and found to melt at about 69–70° C.

Example 14

To 108.5 parts of β-chloropropionic acid are added 97.8 parts of phosphorous trichloride. The mixture is refluxed for 3 hours and then cooled. The solution is decanted and 84 parts of thiophene and 800 parts of benzene are added. The mixture is cooled to about —5° C., and 312.6 parts of stannic chloride are added portionwise over a period of 3 hours. Stirring is continued for 2 hours without cooling. The solution is filtered and the filtrate is extracted with about 1200 parts of benzene. The solvent is evaporated leaving an oil which solidifies in 400 parts of ether. The precipitate is recovered by filtration and redissolved in 400 parts of ether. The solution is filtered and the filtrate is evaporated. The residue is distilled to yield 2-(β-chloropropionyl)thiophene boiling at about 119–121° C. at 6 mm. pressure.

A mixture of 10 parts of 2-(β-chloropropionyl)thiophene and 16.2 parts of 1-phenylpiperazine is stirred in a flask under cooling. After the reaction mixture solidifies, the contents are boiled with 500 parts of water and 600 parts of ether. The ethereal solution is separated, dried over anhydrous potassium carbonate, filtered, and evaporated until a precipitate is formed. The precipitate is collected on a filter to yield 1-[β-(2-thenoyl)ethyl]-4-phenylpiperazine melting at about 66–68° C.

Example 15

While the flask is cooled with water, 8.7 parts of 2-(β-chloropropionyl)thiophene and 17.6 parts of 1-(m-tolyl)-piperazine are stirred. The mixture is maintained at room temperature for 65 hours. The mixture solidifies and the solid is boiled with 600 parts of ether and then filtered. The ethereal solution is washed with water, dried over anhydrous potassium carbonate, filtered, and evaporated. The residue is taken up in 200 parts of diisopropyl ether and then the solution is filtered and cooled. The 1-[β-(2-thenoyl)ethyl]-4-(m-tolyl)piperazine thus obtained is recovered by filtration and is found to melt at about 91–92° C.

Example 16

Substitution of an equimolar amount of α-chloroacetyl chloride for the γ-chlorobutyryl chloride in Example 1 yields the white, prismatic crystals of 2-(α-chloroacetyl)-thiophene.

A mixture of 6.5 parts of 2-(α-chloroacetyl)thiophene and 18 parts of 1-(p-ethoxyphenyl)piperazine in 50 parts of benzene is allowed to stand at room temperature for 48 hours. The benzene is distilled and the residue is boiled in diisopropyl ether. The insoluble residue is filtered off, and the filtrate is evaporated until a precipitate forms. The product is collected on a filter, dissolved in diisopropyl ether, and decolorized by boiling with activated charcoal. The charcoal is filtered off, and the solution is cooled. The white crystals of 1-[α-(2-thenoyl)methyl]-4-(p-ethoxyphenyl)piperazine are collected on a filter.

What is claimed is:

1. A compound of the structural formula

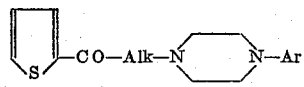

wherein Ar is a member of the class consisting of halophenyl radicals, lower alkyloxyphenyl radicals, and monocyclic aryl hydrocarbon radicals of less than nine carbon atoms and wherein Alk is a lower alkylene radical.

2. A compound of the structural formula

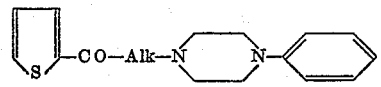

wherein Alk is a lower alkylene radical.

3. 1-[γ-(2-thenoyl)propyl]-4-phenylpiperazine.

4. A compound of the structural formula

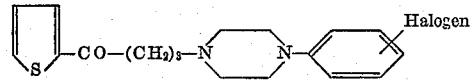

5. 1-[γ-(2-thenoyl)propyl]-4-(fluorophenyl)piperazine.
6. 1-[γ-(2-thenoyl)propyl]-4-(chlorophenyl)piperazine.
7. 1-[γ-(2-thenoyl)propyl]-4-tolylpiperazine.
8. 1-[γ-(2-thenoyl)propyl]-4-(anisyl)piperazine.

References Cited in the file of this patent

Cymerman-Craig et al.: Australian Jour. Chemistry, vol. 8, pp. 378–384 (1955).